US009152601B2

(12) United States Patent
Kaminski et al.

(10) Patent No.: US 9,152,601 B2
(45) Date of Patent: Oct. 6, 2015

(54) POWER-EFFICIENT NESTED MAP-REDUCE EXECUTION ON A CLOUD OF HETEROGENEOUS ACCELERATED PROCESSING UNITS

(71) Applicant: Advanced Micro Devices, Inc., Sunnyvale, CA (US)

(72) Inventors: Patryk Kaminski, Austin, TX (US); Mauricio Breternitz, Austin, TX (US); Gary R. Frost, Driftwood, TX (US); Christophe Harle, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 231 days.

(21) Appl. No.: 13/890,828

(22) Filed: May 9, 2013

(65) Prior Publication Data

US 2014/0333638 A1 Nov. 13, 2014

(51) Int. Cl.
*G06F 15/80* (2006.01)
*G06F 15/17* (2006.01)
*G06T 1/20* (2006.01)
*G06F 9/50* (2006.01)

(52) U.S. Cl.
CPC .................. *G06F 15/17* (2013.01); *G06F 9/50* (2013.01); *G06T 1/20* (2013.01)

(58) Field of Classification Search
CPC .............. G06F 15/17; G06F 9/50; G06T 1/20
USPC .......................................................... 345/505
See application file for complete search history.

(56) References Cited

U.S. PATENT DOCUMENTS

2003/0169269 A1* 9/2003 Sasaki et al. .................. 345/581

OTHER PUBLICATIONS

Lindholm et al., Nvidia Tesla: A Unified Graphics and Computing Architecture, Dec. 2008, p. 39-55.*
"AMD Completes Acquisition of SeaMicro," SeaMicro Press Release, accessed at http://www.seamicro.com/node/242, published on Mar. 23, 2012; 2 pages.
Dean, J., et al., "MapReduce: Simplified Data Processing on Large Clusters," Communications of the ACM, vol. 51, No. 1, Jan. 2008; pp. 107-113.
Frost, G., "APARAPI: Java™ platform's 'Write Once Run Anywhere'® now includes the GPU," AMD Fusion[11] Developer Summit, Jun. 2011; 40 pages.

(Continued)

*Primary Examiner* — Stephen R Koziol
*Assistant Examiner* — Robert Craddock
(74) *Attorney, Agent, or Firm* — Volpe and Koenig, P.C.

(57) ABSTRACT

An approach and a method for efficient execution of nested map-reduce framework workloads to take advantage of the combined execution of central processing units (CPUs) and graphics processing units (GPUs) and lower latency of data access in accelerated processing units (APUs) is described. In embodiments, metrics are generated to determine whether a map or reduce function is more efficiently processed on a CPU or a GPU. A first metric is based on ratio of a number of branch instructions to a number of non-branch instructions, and a second metric is based on the comparison of execution times on each of the CPU and the GPU. Selecting execution of map and reduce functions based on the first and second metrics result in accelerated computations. Some embodiments include scheduling pipelined executions of functions on the CPU and functions on the GPU concurrently to achieve power-efficient nested map reduce framework execution.

17 Claims, 7 Drawing Sheets

(56) References Cited

OTHER PUBLICATIONS

Higgenbotham, S., "Cloudera who? Intel announces its own Hadoop distribution," accessed at http://gigaom.com/2013/02/26/cloudera-who-intel-announces-its-own-hadoop-distribution, published Feb. 26, 2013; 3 pages.

Sheppard, A., "Hadoop + GPU: GPU acceleration for 'Big Data'," AMD Fusion[12] Developer Summit, Jun. 2012; 12 pages.

Yigitbasi, N., et al., "Energy Efficient Scheduling of MapReduce Workloads on Heterogeneous Clusters," GCM '11—Proceedings of the $2^{nd}$ Workshop on Green Computing Middleware, Dec. 12, 2011; 6 pages.

* cited by examiner

POWER-EFFICIENT NESTED MAP-REDUCE EXECUTION ON A CLOUD OF HETEROGENEOUS ACCELERATED PROCESSING UNITS

BACKGROUND

1. Field

The embodiments are generally directed to cloud computing, and in particular, to the execution of map-reduce workloads on a cloud of heterogeneous accelerated processing units.

2. Background Art

Cloud computing includes workload execution on networks of computer systems. A map-reduce framework is an example of a program utilized in a wide range of business configurations including for example, social networks, recommendation engines, and business data analytics. Most computer systems execute map-reduce workloads on central processing units (CPUs). Some computer systems include an accelerated processing unit (APU) environment that includes a combination of a CPU and a graphics processing unit (GPU). However, such computer systems execute workloads inefficiently.

BRIEF SUMMARY OF EMBODIMENTS

What is needed is a method, computer program product, and system that substantially improve the efficiency of execution of nested map-reduce workloads by fully utilizing the concurrent execution of a CPU and a GPU, and take advantage of the lower latency for data access provided by APUs.

Embodiments include an APU that includes a CPU and a GPU, first analyzing a map function by the APU to generate a first metric, and then analyzing a reduce function by the APU to generate a second metric. Embodiments further include executing the map function by either the CPU or the GPU based on the first metric, and executing the reduce function by either the CPU or the GPU based on the second metric.

In some embodiments, the first metric includes a ratio of a number of branch instructions to a number of non-branch instructions in the map function. Embodiments include executing the map function by the GPU when the first metric is less than or equal to a configurable threshold, and executing the map function by the CPU when the first metric is greater than the configurable threshold.

In some embodiments, the first metric includes execution times of the map function on each of the CPU and the GPU. Embodiments include executing the map function by the GPU when the execution time of the map function on the GPU is less than or equal to the execution time of the map function on the CPU. Some embodiments include executing the map function by the CPU, when the execution time of the map function on the GPU is greater than the execution time of the map function on the CPU.

In additional embodiments, the second metric includes a ratio of a number of branch instructions to a number of non-branch instructions in the reduce function. Embodiments include executing the reduce function by the GPU when the first metric is less than or equal to a configurable threshold, and executing the reduce function by the CPU when the first metric is greater than the configurable threshold.

In some embodiments, the second metric includes execution times of the reduce function on each of the CPU and the GPU. Embodiments include executing the reduce function by the GPU, when the execution time of the reduce function on the GPU is less than or equal to the execution time of the reduce function on the CPU. Embodiments also include executing the reduce function by the CPU, when the execution time of the reduce function on the GPU is greater than the execution time of the reduce function on the CPU.

Additional embodiments include scheduling a pipelined execution by the CPU. Embodiments include first executing, on the GPU, a map function applied to a first input to generate a first intermediate result, then executing, also on the GPU, the map function applied to a second input to generate a second intermediate result. Another embodiment includes executing, on the CPU, a reduce function applied to the first intermediate result, at substantially the same time as the second executing.

Some embodiments include scheduling a pipelined execution by the CPU. Embodiments include first executing, on the CPU, a map function applied to a first input to generate a first intermediate result, then executing, also on the CPU, the map function applied to a second input to generate a second intermediate result. Another embodiment includes executing, on the GPU, a reduce function applied to the first intermediate result, at substantially the same time as the second executing.

Further features and advantages of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the embodiments and, together with the description, further serve to explain the principles of the embodiments and to enable a person skilled in the pertinent art to make and use the embodiments. Various embodiments are described below with reference to the drawings, wherein like reference numerals are used to refer to like elements throughout.

The embodiments will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
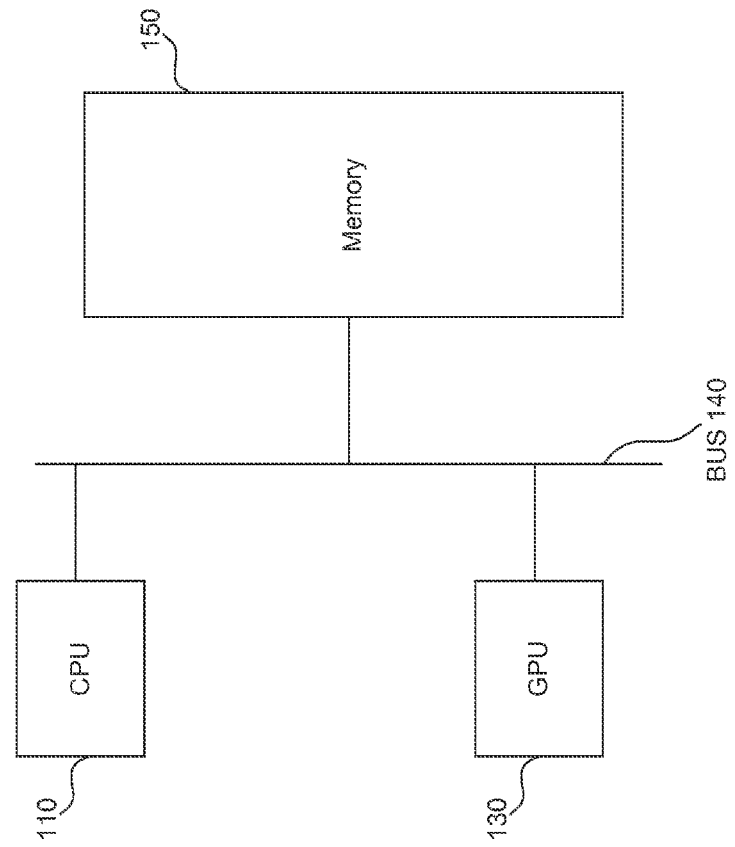
FIG. 1 is a block diagram of an APU environment.

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Electronic devices process data and provide many applications to users. Example electronic devices include, but are not limited to, mobile phones, personal computers, workstations, and game consoles. Electronic devices use a central processing unit ("CPU") to process data. A CPU is a processor which carries out instructions of computer programs or applications. For example, a CPU carries out instructions by performing arithmetical, logical and input/output operations. In an embodiment, a CPU performs control instructions that include decision making code of a computer program or an application, and delegates processing to other processors in the electronic device, such as a graphics processing unit ("GPU").

A GPU is a specialized processor that is designed to rapidly process mathematically intensive applications. The GPU has a highly parallel structure that is efficient for parallel processing of large blocks of data, such as mathematically intensive data common to computer graphics applications, images and videos. The GPU may receive data for processing from a CPU or generate data for processing from previously processed data and operations. In an embodiment, the GPU is a hardware-based processor that uses hardware to process data in parallel.

Due to advances in technology, a GPU also performs general purpose computing (also referred to as GPGPU computing). In the GPGPU computing, a GPU performs computations that traditionally were handled by a CPU. A GPU and GPGPU are examples of a graphics engine. An accelerated processing unit (APU) includes the functions of a CPU and a GPU or GPGPU.

In an embodiment, a GPU includes one or more compute units that process data. A compute unit includes arithmetic logic units (ALU's) and other resources that process data on the GPU. Data can be processed in parallel within and across compute units.

In an embodiment, a control processor on a GPU schedules task processing on compute units. Tasks include computation instructions. Those computation instructions may access data stored in the memory system of an electronic device and manipulate the accessed data. In an embodiment, the data may be stored in volatile or non-volatile memory. An example of volatile memory includes random access memory (RAM). Examples of RAM include dynamic random access memory (DRAM) and static random access memory (SRAM). Volatile memory typically stores data as long as the electronic device receives power. Examples of non-volatile memory include read-only memory, flash memory, ferroelectric RAM (F-RAM), hard disks, floppy disks, magnetic tape, optical discs, etc. Non-volatile memory retains its memory state when the electronic device loses power or is turned off.

FIG. 1 is a block diagram of a computer system 100 that supports an embodiment. In the example shown, system 100 is an APU environment that includes CPU 110, GPU 130, RAM memory 150, and bus 140.

Bus 140 may be any type of communication infrastructure used in computer systems, including a peripheral component interface (PCI) bus, a memory bus, a PCI Express (PCIE) bus, front-side bus (FSB), hypertransport (HT), or another type of communication structure or communications channel whether presently available or developed in the future.

Figure 2:
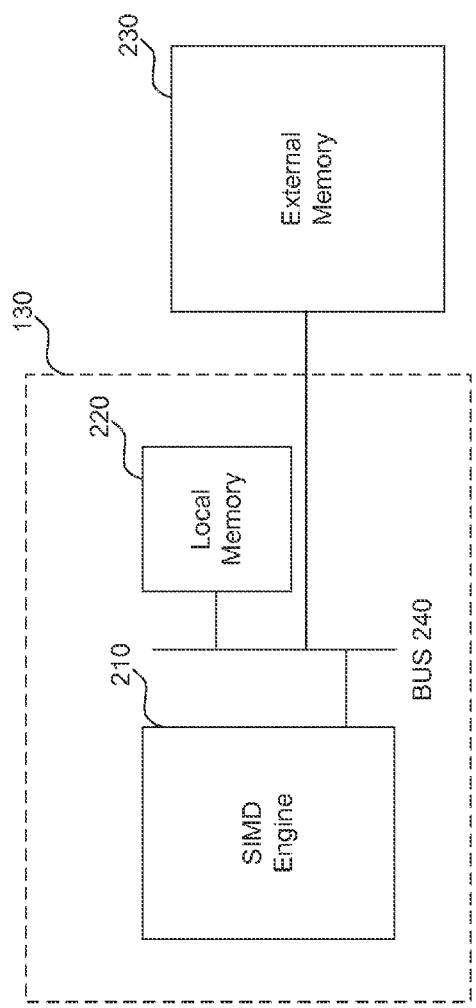
FIG. 2 is a more detailed block diagram of a GPU as shown in FIG. 1.

FIG. 2 is a more detailed block diagram of GPU 130 as shown in FIG. 1. Diagram 200 includes GPU 130 and external memory 230. External memory 230 is a portion of memory 150 of FIG. 1. GPU 130 includes single instruction, multiple data (SIMD) engine 210 that performs parallel processing, local memory 220, and bus 240. Bus 240 is substantially the same as bus 140 of FIG. 1. Local memory 220 is cache memory that is dedicated for SIMD engine 210 access. SIMD engine 210 is configured to process blocks of data according to the size of local memory 220. Although SIMD engine 210 can process data obtained from local memory 220 or external memory 230, SIMD engine 210 can process blocks of data from local memory 220 faster and more efficiently than data from external memory 230.

Figure 3:
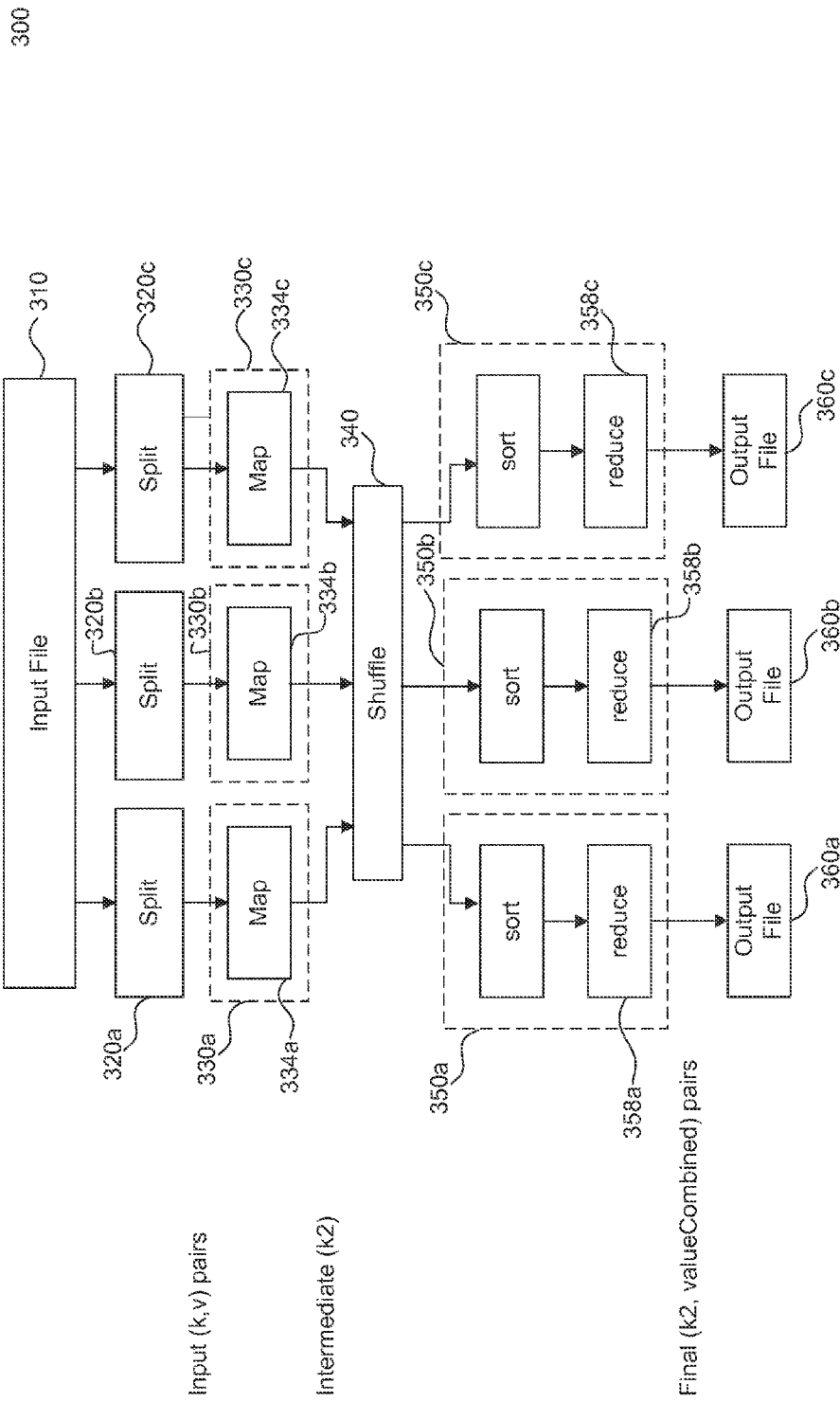
FIG. 3 is a diagram depicting a map-reduce framework operation.

FIG. 3 is a diagram 300 depicting a map-reduce framework operation. In one example, system 100 may be used to perform a map-reduce framework operation. It is to be appreciated that operations in diagram 300 may be performed in a different order than shown, and diagram 300 may not include all operations shown. For ease of discussion, and without limitation, diagram 300 will be described in terms of elements shown in FIG. 1.

Map-reduce framework 300 is distributed to many computers or nodes 330 and 350 in a cluster for execution. Computers 330 and 350 typically include CPU 110, bus 140, and system memory 150. In addition, some computers 330 and 350 include GPU 130. A map-reduce framework runs on a CPU in each of computers 330 and 350. A map-reduce framework has two phases: a map phase and a reduce phase. The map phase includes functions to partition, distribute, and process data from input file 310 to computers 330. The reduce phase includes functions to collect, sort, and process the output from computers 330 to produce the final results in output file 360. The map-reduce framework includes map function 334 in the map phase that ties into the map-reduce framework, as well as reduce function 358 in the reduce phase that also ties into the map-reduce framework.

In the map phase, data from input file 310 is partitioned into splits 320a, 320b, and 320c according to file system block-size constraints. Data splits 320 are distributed among the available computers 330. The map phase is entirely data parallel, i.e., functions are completed in each computer 330a, 330b, and 330c in parallel. For example, CPU 110 in computer 330a applies map function 334a to every item in input-dataset split 320a, which is a list of input pairs of the form (key, value). Computer 330a processes the respective split 320a of the input data by executing the user defined map function 334a on CPU 110 producing a list of intermediate pairs (key2, value2) in the output domain. Similar functions take place in computers 330b and 330c concurrently.

In the reduce phase, inter-computer communication is needed to collect data produced by the map phase. Intermediate pair results from computers 330a, 330b, and 330c are transported e.g., over a cluster interconnection network or data center network, according to shuffle function 340 to computers 350a, 350b, and 350c, where the intermediate pairs (key2, value2) are sorted to group occurrences of the same key together before being input to a user-defined reduce function 358. Computers 358a, 358b, and 358c generate a final list of pairs (key2, valueCombined) by combining all value2 instances for each key2. For example, a CPU 110-only execution of map-reduce framework in computer 350a receives, sorts, and then executes user-defined reduce function 358a on CPU 110 with sorted intermediate pairs as the input. The results are saved in output file 360a. Similar functions take place in computers 330b and 330c.

Figure 4:
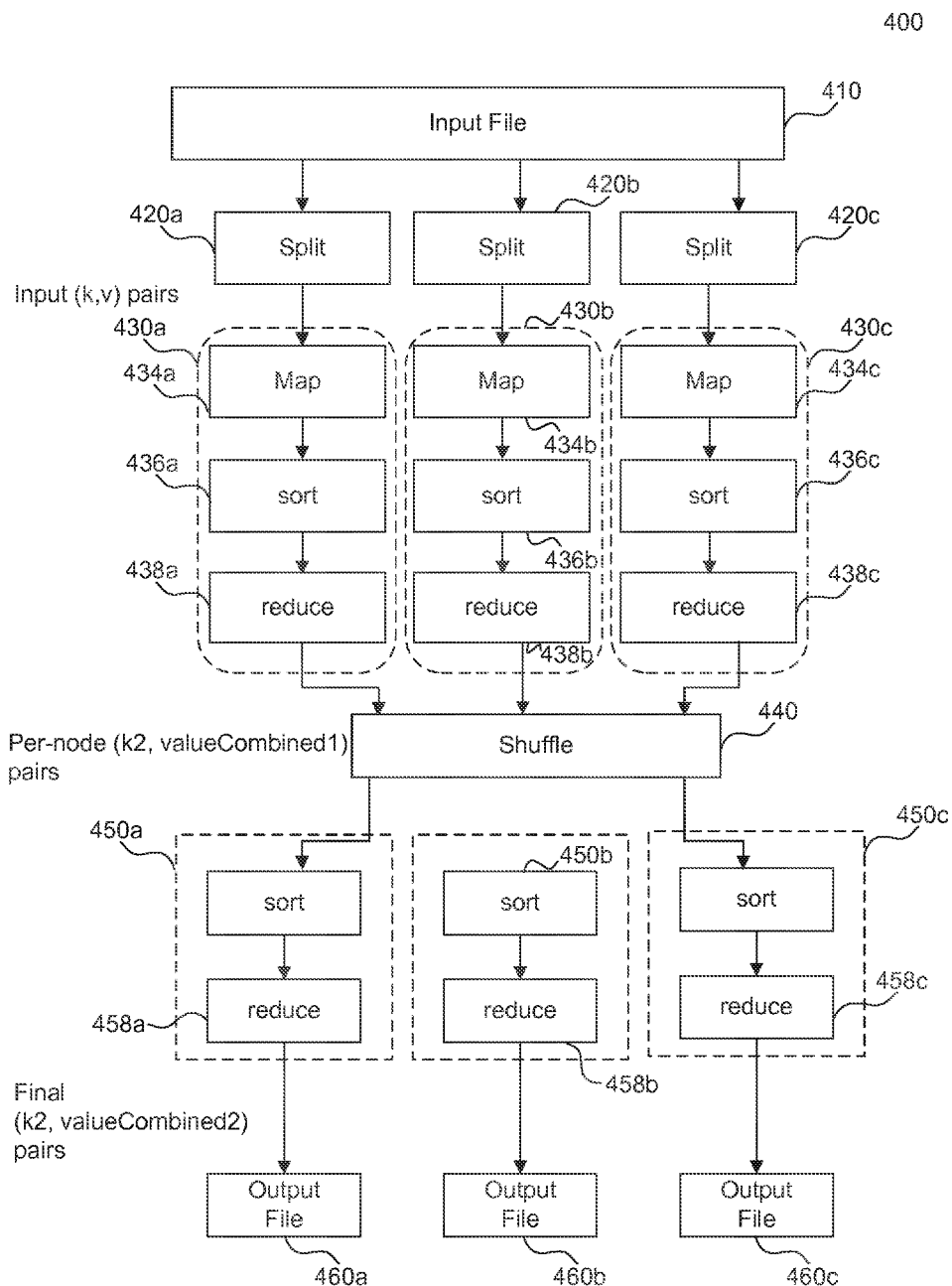
FIG. 4 is a diagram depicting a nested map-reduce framework operation.

FIG. 4 is a diagram 400 depicting a nested map-reduce framework operation. In one example, system 100 may be used to perform a nested map-reduce framework operation. It is to be appreciated that operations in diagram 400 may be performed in a different order than shown, and diagram 400 may not include all operations shown. For ease of discussion, and without limitation, diagram 400 will be described in terms of elements shown in FIG. 1.

Nested map-reduce framework 400 is similar to map-reduce framework 300 with the addition of a sort function 436 and reduce function 438 added to computers 430a, 430b, and 430c. The remaining elements of diagram 400 are substantially the same as the elements of map-reduce framework 300.

A nested map-reduce framework also has two phases: a nested map phase and a global-reduce phase. The nested-map phase includes functions to partition, distribute, and process data from input file 410 to computers 430. The nested-map phase includes user-defined map function 434, sort function 436, and user-defined reduce function 438. The global-reduce phase includes functions to collect, sort, and process the output from computers 430 to produce the final results in output file 460. The global-reduce phase includes a sort function as well as user-defined reduce function 458.

In the nested-map phase, data from input file 410 is partitioned into splits 420a, 420b, and 420c according to file system block-size constraints. Data splits 420 are distributed among the available computers 430. The nested-map phase is entirely data parallel, i.e., functions are completed in each computer 430a, 430b, and 430c in parallel. For example, CPU 110 in computer 430a applies user-defined map function 434a to every item in input-dataset split 420a, which is a list of input pairs of the form (key, value). Computer 430a processes the respective split 420a of the input data by executing the user-defined map function 434a, sort function 436a, and user-defined reduce function 438a on CPU 110 producing a list of intermediate pairs (key2, valueCombined1) in the output domain. Similar functions take place in computers 430b and 430c concurrently. By performing a reduce function 438 in the nested-map phase, data is condensed so the amount of data that is transported via shuffle function 440 is reduced compared to data transported via shuffle function 340 of FIG. 3.

In the global-reduce phase, inter-computer communication is needed to collect data produced by the nested-map phase. Pair results from computers 430a, 430b, and 430c are transported e.g., over a cluster interconnection network or data center network, according to shuffle function 440 to computers 450a, 450b, and 450c, where the pairs (key2, valueCombined1) are sorted to group occurrences of the same key together before being input to reduce function 458. Computers 458a, 458b, and 458c generate a final list of pairs (key2, valueCombined2) by combining all valueCombined1 instances for each key2. For example, a CPU 110-only execution of nested map-reduce framework in computer 450a receives, sorts, and then executes reduce function 458a on CPU 110 with sorted pairs as the input. The results are saved in output file 460a. Similar functions take place in computers 430b and 430c.

Efficient, CPU 110-only execution of map-reduce framework 300 workloads and nested map-reduce framework 400 workloads using hand-coded solutions are known. However, when GPU 130 is utilized, map-reduce framework 300 and nested map-reduce framework 400 implementations do not take advantage of the combined execution of CPU 110 and GPU 130, nor of the lower latency for data access provided by APUs.

Embodiments are provided that accelerate map-reduce computations on a cloud of heterogeneous processors such as APUs that result in power-efficient nested map-reduce framework execution. Embodiments include a power-efficient nested map-reduce framework where input data is partitioned among computers in block sizes adequate for execution on a GPU, and decisions are made to determine whether a map or reduce function is more efficient on a CPU or a GPU. In addition, the power-efficient nested map reduce framework includes scheduling pipelined executions of functions on the CPU and functions on the GPU concurrently to achieve power-efficient performance.

Figure 5:
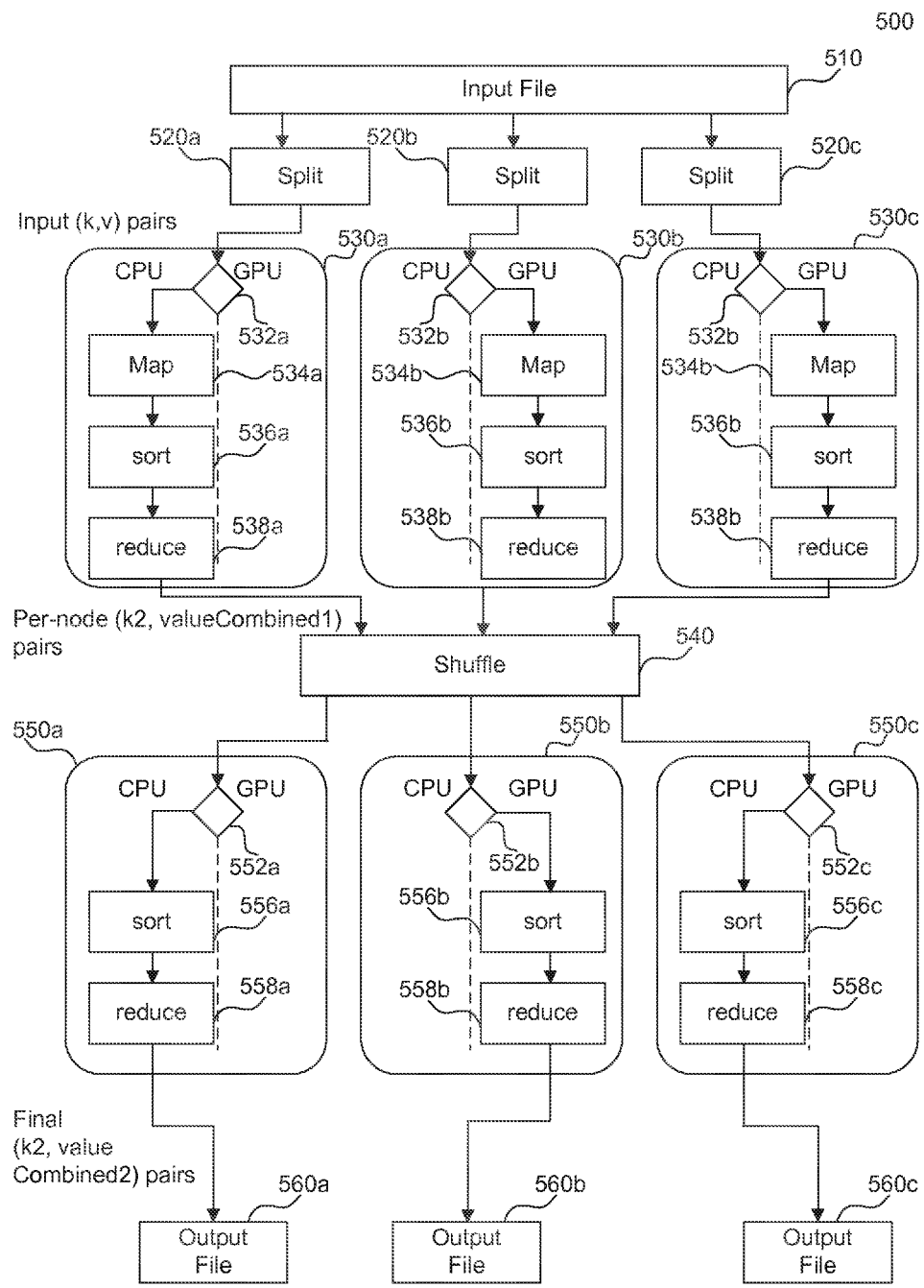
FIG. 5 is a diagram depicting a nested map-reduce framework operation according to an embodiment.

FIG. 5 is a diagram 500 depicting a nested map-reduce framework operation according to an embodiment. In one example, system 100 and diagram 200 may be used to perform a power-efficient nested map-reduce framework operation. It is to be appreciated that operations in diagram 500 may be performed in a different order than shown, and diagram 500 may not include all operations shown. For ease of discussion, and without limitation, diagram 500 will be described in terms of elements shown in FIG. 1 and FIG. 2.

Power-efficient nested map-reduce framework 500 is similar to nested map-reduce framework 400 with split 520 being based on GPU 130, decision step 532 added to computers 530a, 530b, and 530c, and decision step 552 added to computers 550a, 550b, and 550c. The remaining elements of diagram 500 are substantially the same as the elements of nested map-reduce framework 400.

Power-efficient nested map-reduce framework also has two phases: a nested map phase and a global-reduce phase. The nested-map phase includes functions to partition, distribute, and process data from input file 510 to computers 530. The nested-map phase includes map function 534, sort function 536, and reduce function 538. The global-reduce phase includes functions to collect, sort, and process the output from computers 530 to produce the final results in output file 560. The global-reduce phase includes a sort function as well as reduce function 558.

In the power-efficient nested-map phase, data from input file 510 is partitioned into splits 520a, 520b, and 520c based on GPU 130, rather than on file system block-size constraints. In particular, split 520 is based on the size of local memory 220 of GPU 130. Data splits 520 are distributed among the available computers 530. The power-efficient nested-map phase is entirely data parallel, i.e., functions are completed in each computer 530a, 530b, and 530c in parallel.

When invoked at decision step 532, CPU 110, running power-efficient nested map-reduce framework, analyzes map function 534 and reduce function 538 to determine whether to execute on CPU 110 or GPU 130. For example, decision step 532 can entail compiling map function 534 and reduce function 538, and analyzing the number of branches, e.g., a number of if-then statements and non-branches of code. If the ratio of the number of branches to the number of non-branches of a function analyzed exceeds a configurable threshold, then the function is executed on CPU 110. Otherwise, the function is executed on GPU 130.

In another example, decision step 532 is based on time-trial empirical data. For example, map function 534 executed on CPU 110 is timed and user-defined map function 534 executed on GPU 130 is timed. The times are analyzed and the map function 534 is executed on GPU 130 if the time executed on the GPU is less than or equal to that of the time executed on the CPU. Otherwise, the map function 534 is executed on CPU 110. A similar determination is also made for reduce function 538. In addition, a determination based on analyzing a ratio of branches to non-branches or empirical data is also made at decision step 552 for ascertaining whether global-reduce function 558 is executed on CPU 110 or GPU 130. Many variations are possible to collect empirical data for decision step 532 as well as step 552.

For example, in computer or node 530a, a decision is made at 532a to execute map function 534a and reduce function 538a on CPU 110. Computer 530a processes split 520a, based on the size of local memory 220 of GPU 130, i.e., input pairs of the form (key, value) by executing the map function 534a, sort function 536a, and reduce function 538a on CPU 110 producing a list of intermediate pairs (key2, valueCombined1) in the output domain.

In computer 530b, a decision is made at 532b to execute map function 534b and reduce function 538b on GPU 130. Computer 530b processes split 520b, based on the size of local memory 220 of GPU 130, i.e., input pairs of the form (key, value) by executing the map function 534b, sort function 536b, and reduce function 538b on CPU 110 producing a list of intermediate pairs (key2, valueCombined1) in the output domain.

In computer 530c, a decision is made at 532c to execute map function 534c on GPU 130 and reduce function 538c on CPU 110. Computer 530c processes split 520c, based on the size of local memory 220 of GPU 130, i.e., input pairs of the form (key, value) by executing the map function 534c and sort function 536c on GPU 130. Intermediate results are then input to reduce function 538c on CPU 110 producing a list of intermediate pairs (key2, valueCombined1) in the output domain.

In another example, computer 530c can execute map function 534c and sort function 536c on CPU 110, and reduce function 538c on GPU 130.

In the global-reduce phase, the pair results from computers 530a, 530b, and 530c are transported e.g., over a cluster interconnection network or data center network, according to shuffle function 540 to computers 550a, 550b, and 550c. When invoked at decision step 552, CPU 110, running power-efficient nested map-reduce framework, analyzes reduce function 558 to determine whether to execute on CPU 110 or GPU 130.

For example, in computer or node 550a, a decision is made at 552a to execute reduce function 558a on CPU 110. Pairs (key2, valueCombined1) are sorted to group occurrences of the same key together before being input to reduce function 558a. Computer 550a generates a final list of pairs (key2, valueCombined2) by combining all valueCombined1 instances for each key2, and the results are saved in output file 560a. A similar execution takes place in computer 550c.

In computer 550b, a decision is made at 552b to execute reduce function 558b on GPU 130. Pairs (key2, valueCombined1) are sorted to group occurrences of the same key together before being input to reduce function 558b. Computer 550b generates a final list of pairs (key2, valueCombined2) by combining all valueCombined1 instances for each key2, and the results are saved in output file 560b.

Figure 6:
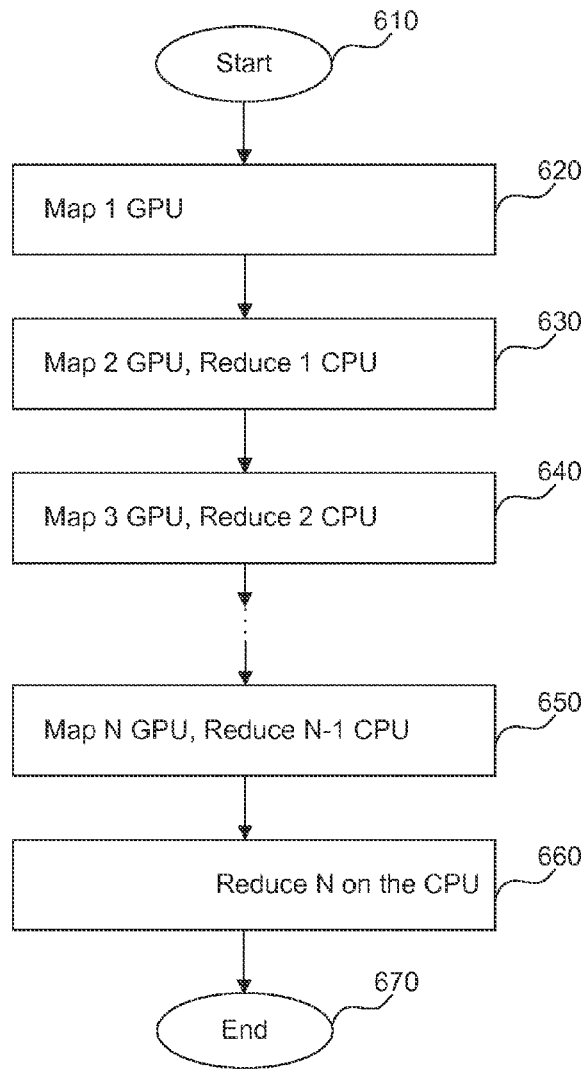
FIG. 6 is a diagram depicting a pipelined execution according to an embodiment.

FIG. 6 is a flowchart depicting a pipelined execution method 600 according to an embodiment. In one example, system 100, diagram 200, and diagram 500 may be used to perform a pipelined execution method 600 of a power-efficient nested map-reduce framework operation. It is to be appreciated that method 600 may be performed in a different order than shown, and method 600 may not include all operations shown. For ease of discussion, and without limitation, method 600 will be described in terms of elements shown in FIG. 1, FIG. 2, and FIG. 5.

In an embodiment, the nested-map phase of a power-efficient nested map-reduce framework can be scheduled for a pipelined execution of map functions on a GPU concurrently with concurrent execution of reduce functions on a CPU for efficient processing.

Pipelined execution method 600 begins at step 610 and proceeds to step 620.

At step 620, map function 534c in computer 530c, is applied to a first input executed on GPU 130, generating a first intermediate result.

At step 630, map function 534c is applied to a second input executed on GPU 130, generating a second intermediate result at substantially the same time that the first intermediate result is applied to reduce function 538c executed on CPU 110.

At step 640, map function 534c is applied to a third input executed on GPU 130, generating a third intermediate result at substantially the same time that the second intermediate result is applied to reduce function 538c executed on CPU 110.

At step 650, map function 534c is applied to an Nth input executed on GPU 130, generating an Nth intermediate result at substantially the same time that the N−1 intermediate result is applied to reduce function 538c, executed on CPU 110, where N is an integer.

At step 660, the Nth intermediate result is applied to reduce function 538c executed on CPU 110.

Method 600 ends at step 670.

In an embodiment, the nested-map phase of a power-efficient nested map-reduce framework can be scheduled for a pipelined execution of map functions on a CPU concurrently with concurrent execution of reduce functions on a GPU for efficient processing.

In the power-efficient nested map-reduce framework on a cloud of heterogeneous APUs, split 520 according to local memory 220 size of GPU 130 and decision steps 532 and 552 are transparent to users. In addition, scheduled pipelined execution results in achieving substantially improved performance at reduced power than non-pipelined executions due to efficient use of CPU and GPU resources.

For illustrative purposes, and not limitation, an example of a power-efficient nested map-reduce execution on a cloud of heterogeneous APUs is described for Hadoop. Hadoop is an open-source Java™-based implementation of a map-reduce framework. For ease of discussion, and without limitation, a Hadoop map-reduce-reduce example will be described in terms of elements shown in FIG. 1, FIG. 2, and FIG. 5.

A Hadoop cluster includes a single master and multiple worker nodes or computers. Hadoop distributed file system (HDFS) is utilized to store and communicate data between worker nodes. The file system supports replication for reliability. The master node is in charge of tracking job initiation and completion as well as file system metadata, respectively through processes called JobTracker and NameNode. JobTracker is a service within Hadoop that sends map-reduce tasks to computers or nodes in the cluster. NameNode is a central part of HDFS that keeps track of the location of files in the system. A worker node runs TaskTracker processes that communicate with the master to initiate map or reduce tasks on each worker node. DataNodes are in charge of maintaining HDFS data entries.

To create a Hadoop job, a user specifies map functions 534 and reduce functions 536 as Java methods. These methods extend predefined 'Map' and 'Reduce' classes that tie into the Hadoop map-reduce-reduce framework.

In the example, a tool is utilized to convert Java methods to GPU operations. Thus, map functions 534, reduce functions 536, and reduce functions 558 in Java methods, for example, can be converted to GPU operations without the user having to specify any GPU code.

In an embodiment with Hadoop, in the nested-map phase, data from input file 510 is partitioned into splits 520a, 520b, and 520c based on the size of local memory 220 of GPU 130. Data splits 520 are distributed among the available computers 530. When invoked at decision step 532, the tool is used to compile and schedule map function 534 and reduce function 538. For example, due to a compiler, or the tool analysis of map function 534 source branching organization, or empirical execution time data, an embodiment determines whether to execute map function 534 on CPU 110 or GPU 130. A similar determination is made regarding executing reduce function 538 on CPU 110 or GPU 130.

Based on the analysis, an embodiment may for example, schedule executions entirely on CPU 110 as shown in computer 530a, entirely on GPU 130 as shown in computer 530b, or in combination as shown in computer 530c. In the latter, an embodiment can schedule executions in a pipelined fashion to execute map function 534c on GPU 130 and concurrently execute reduce function 538c on CPU 110 as described in FIG. 6. In another embodiment, computer 530c can execute map function 534c and sort function 536c on CPU 110, and reduce function 538c on GPU 130. Embodiments may also schedule executions in a pipelined fashion accordingly.

In an embodiment with Hadoop, in the global-reduce phase, pair results from computers 530a, 530b, and 530c are transported e.g., over a cluster interconnection network or data center network, according to shuffle function 540 to computers 550a, 550b, and 550c. When invoked at decision step 552, an embodiment may analyze reduce function 558 to determine whether to execute on CPU 110 or GPU 130. A similar determination based on analyzing branches or empirical data, is made at decision step 552 for ascertaining whether reduce function 558 is executed on CPU 110 or GPU 130.

Figure 7:
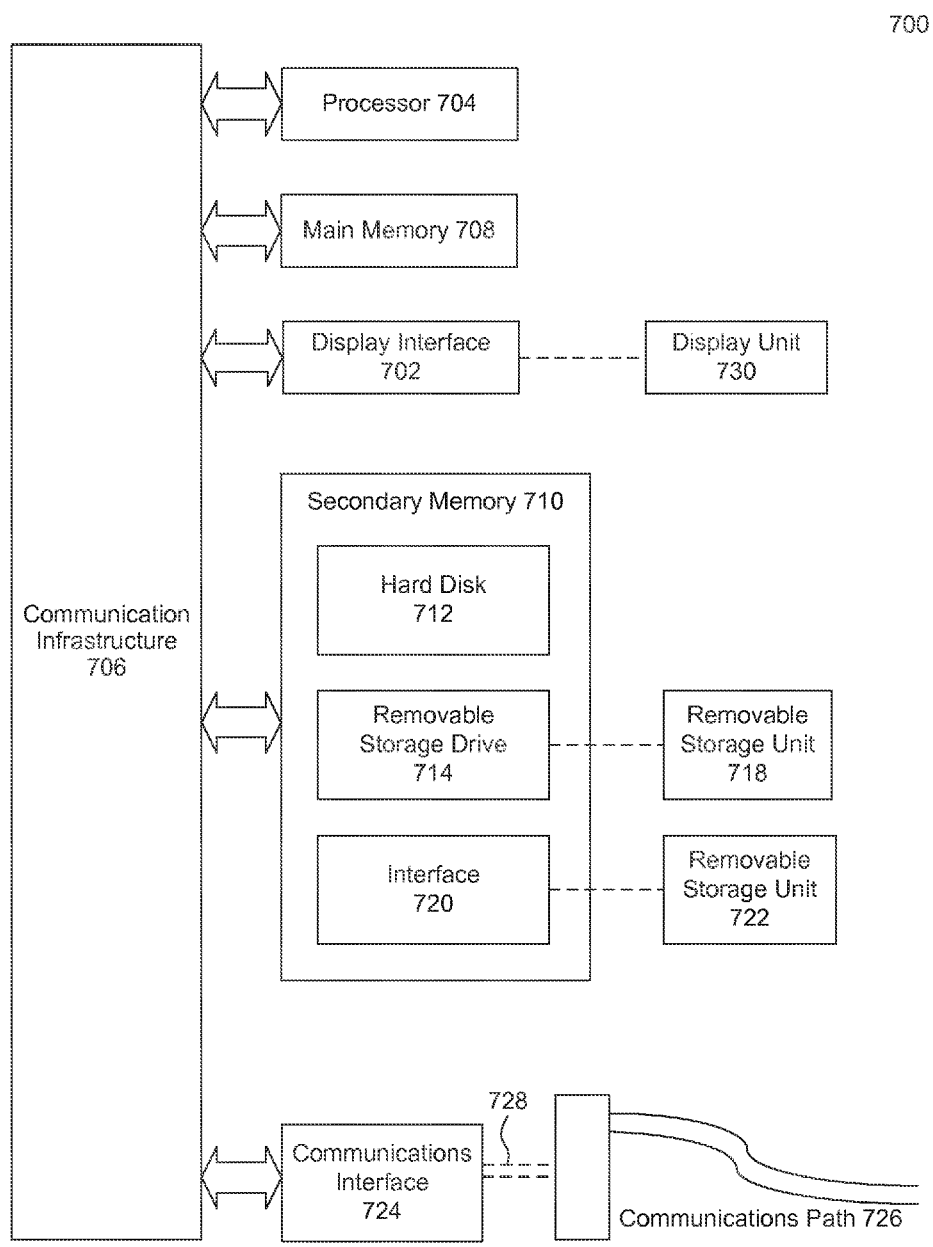
FIG. 7 illustrates an example computer system in which embodiments of a power-efficient nested map reduction on APUs may be implemented.

Various aspects of the disclosure can be implemented by software, firmware, hardware, or a combination thereof. FIG. 7 illustrates an example computer system 700 in which some embodiments, or portions thereof, can be implemented as computer-readable code. For example, diagram 500 of FIG. 5 and method 600 of FIG. 6 can be implemented in system 700. Various embodiments are described in terms of the example computer system 700. After reading this description, it will become apparent to a person skilled in the relevant art how to implement the embodiments using other computer systems and/or computer architectures.

Computer system 700 includes one or more processors, such as processor 704. Processor 704 can be a special purpose or a general purpose processor. Examples of processor 704 are an APU that includes CPU 110 and GPU 130 of FIG. 1.

Processor 704 is connected to a communication infrastructure 706 (for example, a bus or network) such as bus 140 of FIG. 1.

Computer system 700 also includes a main memory 708, such as random access memory (RAM) such as memory 150 of FIG. 1, and may also include a secondary memory 710. Secondary memory 710 may include, for example, a hard disk drive 120, a removable storage drive 714, and/or a memory stick. Removable storage drive 714 may comprise a floppy disk drive, a magnetic tape drive, an optical disk drive, a flash memory, or the like. The removable storage drive 714 reads from and/or writes to a removable storage unit 718 in a well-known manner. Removable storage unit 718 may comprise a floppy disk, magnetic tape, optical disk, etc. that is read by and written to by removable storage drive 714. As will be appreciated by persons skilled in the relevant art(s), removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 that allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 are in the form of signals that may be electronic, electromagnetic, optical, or other signals capable of being received by communications interface 724. These signals are provided to communications interface 724 via a communications path 726. Communications path 726 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 718, removable storage unit 722, and a hard disk installed in hard disk drive 712. Signals carried over communications path 726 can also embody the logic described herein. Computer program medium and computer usable medium can also refer to memories, such as main memory 708 and secondary memory 710, which can be memory semiconductors (e.g. DRAMs, etc.). These computer program products are means for providing software to computer system 700.

Computer programs (also called computer control logic) are stored in main memory 708 and/or secondary memory 710. Computer programs may also be received via communications interface 724. Such computer programs, when executed, enable computer system 700 to implement the embodiments as discussed herein. In particular, the computer programs, when executed, enable processor 704 to implement the disclosed processes, such as diagram 500 of FIG. 5 and the steps in the methods 600 of FIG. 6 as discussed above. Accordingly, such computer programs represent controllers of the computer system 700. Where the embodiments are implemented using software, the software may be stored in a computer program product and loaded into computer system 700 using removable storage drive 714, interface 720, hard drive 712 or communications interface 724. This can be accomplished, for example, through the use of general-programming languages (such as C or C++). The computer program code can be disposed in any known computer-readable medium including semiconductor, magnetic disk, or optical disk (such as CD-ROM, DVD-ROM). As such, the code can be transmitted over communication networks including the Internet and internets. It is understood that the functions accomplished and/or structure provided by the systems and techniques described above can be represented in a core (such as a processing-unit core) that is embodied in program code and may be transformed to hardware as part of the production of integrated circuits. This can be accomplished, for example, through the use of hardware-description languages (HDL) including Verilog HDL, VHDL, Altera HDL (AHDL) and so on, or other available programming and/or schematic-capture tools (such as circuit-capture tools).

Embodiments are also directed to computer program products comprising software stored on any computer useable medium. Such software, when executed in one or more data processing device, causes a data processing device(s) to operate as described herein. Embodiments employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A method comprising:
a first analyzing, by an accelerated processing unit (APU), wherein the APU includes a central processing unit (CPU) and a graphics processing unit (GPU), of a map function to generate a first metric, wherein the first metric includes a ratio of a number of branch instructions to a number of non-branch instructions in the map function; and
a second analyzing, by the APU, of a reduce function to generate a second metric;
executing the map function by either the CPU or the GPU based on the first metric,
wherein the map function is executed on the GPU when the first metric is less than or equal to a configurable threshold, and
wherein the map function is executed on the CPU when the first metric is greater than the configurable threshold; and
executing the reduce function by either the CPU or the GPU based on the second metric.

2. The method according to claim 1, wherein the first metric includes execution times of the map function on each of the CPU and the GPU, further comprising:
executing the map function by the GPU, when the execution time of the map function on the GPU is less than or equal to the execution time of the map function on the CPU; and
executing the map function by the CPU, when the execution time of the map function on the GPU is greater than the execution time of the map function on the CPU.

3. The method according to claim 1, wherein the second metric includes a ratio of a number of branch instructions to a number of non-branch instructions in the reduce function, further comprising:
executing the reduce function by the GPU, when the first metric is less than or equal to a configurable threshold; and
executing the reduce function by the CPU, when the first metric is greater than the configurable threshold.

4. The method according to claim 1, wherein the second metric includes execution times of the reduce function on each of the CPU and the GPU, further comprising:
executing the reduce function by the GPU, when the execution time of the reduce function on the GPU is less than or equal to the execution time of the reduce function on the CPU; and
executing the reduce function by the CPU, when the execution time of the reduce function on the GPU is greater than the execution time of the reduce function on the CPU.

5. The method according to claim 1, further comprising:
scheduling, by the CPU, a pipelined execution comprising:
first executing, on the GPU, a map function applied to a first input to generate a first intermediate result;
second executing, on the GPU, the map function applied to a second input to generate a second intermediate result; and
executing, on the CPU, a reduce function applied to the first intermediate result, at substantially the same time as the second executing.

6. The method according to claim 1, further comprising:
scheduling, by the CPU, a pipelined execution comprising:
first executing, on the CPU, a map function applied to a first input to generate a first intermediate result;
second executing, on the CPU, the map function applied to a second input to generate a second intermediate result; and executing, on the GPU, a reduce function applied to the first intermediate result, at substantially the same time as the second executing.

7. A non-transitory computer-readable storage device having stored thereon instructions, execution of which by an accelerated processing unit (APU), wherein the APU includes a central processing unit (CPU) and a graphics processing unit (GPU), cause the APU to perform operations comprising:
 a first analyzing of a map function to generate a first metric; and
 a second analyzing of a reduce function to generate a second metric, wherein the second metric includes a ratio of a number of branch instructions to a number of non-branch instructions in the reduce function;
 executing the map function on either the CPU or the GPU based on the first metric; and
 executing the reduce function on either the CPU or the GPU based on the second metric,
 wherein the reduce function is executed on the GPU when the second metric is less than or equal to a configurable threshold, and
 wherein the reduce function is executed on the CPU when the second metric is greater than the configurable threshold.

8. The non-transitory computer-readable storage device of claim 7, wherein the first metric includes a ratio of a number of branch instructions to a number of non-branch instructions in the map function, further comprising:
 executing the map function by the GPU, when the first metric is less than or equal to a configurable threshold; and
 executing the map function by the CPU, when the first metric is greater than the configurable threshold.

9. The non-transitory computer-readable storage device of claim 7, wherein the first metric includes execution times of the map function executed on each of the CPU and the GPU, further comprising:
 executing the map function by the GPU, when the execution time of the map function on the GPU is less than or equal to the execution time of the map function on the CPU; and
 executing the map function by the CPU, when the execution time of the map function on the GPU is greater than the execution time of the map function on the CPU.

10. The non-transitory computer-readable storage device of claim 7, wherein the second metric includes execution times of the reduce function on each of the CPU and the GPU, further comprising:
 executing the reduce function by the GPU, when the execution time of the reduce function on the GPU is less than or equal to the execution time of the reduce function on the CPU; and
 executing the reduce function by the CPU, when the execution time of the reduce function on the GPU is greater than the execution time of the reduce function on the CPU.

11. The non-transitory computer-readable storage device of claim 7, further comprising:
 scheduling by the CPU, a pipelined execution comprising:
  first executing on the GPU, a map function applied to a first input to generate a first intermediate result;
  second executing on the GPU, the map function applied to a second input to generate a second intermediate result; and
  executing on the CPU, a reduce function applied to the first intermediate result, at substantially the same time as the second executing.

12. The non-transitory computer-readable storage device of claim 7, further comprising:
 scheduling by the CPU, a pipelined execution comprising:
  first executing on the CPU, a map function applied to a first input to generate a first intermediate result;
  second executing on the CPU, the map function applied to a second input to generate a second intermediate result; and
  executing on the GPU, a reduce function applied to the first intermediate result, at substantially the same time as the second executing.

13. An accelerated processing unit (APU), wherein the APU includes a central processing unit (CPU) and a graphics processing unit (GPU), configured to:
 first analyze a map function to generate a first metric), wherein the first metric includes a ratio of a number of branch instructions to a number of non-branch instructions in the map function;
 second analyze a reduce function to generate a second metric;
 execute the map function on either the CPU or the GPU based on the first metric,
 wherein the map function is executed on the GPU when the first metric is less than or equal to a configurable threshold, and
 wherein the map function is executed on the CPU when the first metric is greater than the configurable threshold; and
 execute the reduce function on either the CPU or the GPU based on the second metric.

14. The APU of claim 13, wherein the first metric includes execution times of the map function on each of the CPU and the GPU:
 wherein the GPU is configured to execute the map function, when the execution time of the map function on the GPU is less than or equal to the execution time of the map function on the CPU; and
 wherein the CPU is configured to execute the map function, when the execution time of the map function on the GPU is greater than the execution time of the map function on the CPU.

15. The APU of claim 13, wherein the second metric includes a ratio of a number of branch instructions to a number of non-branch instructions in the reduce function, the APU further configured to:
 execute the reduce function on the GPU when the first metric is less than or equal to a configurable threshold; and
 execute the reduce function on the CPU when the first metric ratio is greater than the configurable threshold.

16. The APU of claim 13, wherein the second metric includes execution times of the reduce function on each of the CPU and the GPU;
 wherein the GPU is configured to execute the reduce function, when the execution time of the reduce function on the GPU is less than or equal to the execution time of the reduce function on the CPU; and
 wherein the CPU is configured to execute the reduce function, when the execution time of the reduce function on the GPU is greater than the execution time of the reduce function on the CPU.

17. The APU of claim 13, further comprising:
 the CPU configured to schedule a pipelined execution comprising:

the GPU configured to first execute a map function applied to a first input, to generate a first intermediate result;

the GPU configured to second execute the map function applied to a second input, to generate a second intermediate result; and the CPU configured to execute a reduce function applied to the first intermediate result, at substantially the same time as the second execute.

* * * * *